United States Patent [19]

Kerr, III et al.

[11] Patent Number: 4,619,624

[45] Date of Patent: Oct. 28, 1986

[54] METHOD OF MAKING IMPROVED ELECTROLUMINESCENT PANELS

[76] Inventors: Charles Kerr, III, 120 Knox Rd.; Mark Forell, 18 Highland Dr., both of East Aurora, N.Y. 14052

[21] Appl. No.: 781,346

[22] Filed: Sep. 30, 1985

Related U.S. Application Data

[62] Division of Ser. No. 548,972, Nov. 7, 1983, Pat. No. 4,578,617.

[51] Int. Cl.[4] .................................... B29C 43/18

[52] U.S. Cl. .................................... 445/22; 264/161; 264/261; 264/272.16

[58] Field of Search .................... 445/22, 24; 264/161, 264/261, 268, 272.16

[56] References Cited

U.S. PATENT DOCUMENTS

| | | | |
|---|---|---|---|
| 2,313,985 | 3/1943 | Bradshaw | 264/268 X |
| 3,086,250 | 4/1963 | Gits | 264/161 |
| 3,670,067 | 6/1972 | Coolbaugh et al. | 264/272.16 X |
| 3,676,943 | 7/1972 | Kidd, Jr. et al. | 40/544 |
| 4,420,447 | 12/1983 | Nakashima | 264/161 X |

*Primary Examiner*—Kenneth J. Ramsey

*Attorney, Agent, or Firm*—Shlesinger, Fitzsimmons & Shlesinger

[57] ABSTRACT

The weight of an electroluminescent instrument panel is substantially reduced by manufacturing it from a pair of complementary plastic shells, which are molded together by a potting compound. The front shell of the panel is made by vacuum drawing a sheet of plastic over a first die plate, which forms in the back of the sheet a central recess, which has therein a plurality of rearwardly projecting, hollow bosses, and which is surrounded by a shallow overflow trough. One or more EL lamp elements are placed in the central recess with registering openings therein positioned over and surrounding the rearwardly projecting bosses, after which a potting compound is poured into the central recess to cover the EL elements. The complementary rear or back shell, which is also vacuum formed over a second die plate, is then forced into the back of the front shell, thereby causing excess potting material to flow out of the central recess in the front shell and into the surrounding overflow trough. After the potting compound has set the trough section containing the excess potting compound and the closed ends of the registering bosses in the complementary shells are milled away to provide openings for instruments and panel mounting screws.

5 Claims, 8 Drawing Figures

METHOD OF MAKING IMPROVED ELECTROLUMINESCENT PANELS

BACKGROUND OF THE INVENTION

This application is a division of our pending U.S. patent application Ser. No. 06/548,972, filed Nov. 7, 1983 for IMPROVED ELECTROLUMINSCENT PANELS AND METHOD OF MAKING SAME, now U.S. Pat. No. 4,578,617.

This invention relates to EL(electroluminescent) panels that are particularly suited for use as illuminated instrument panels for aircraft, automotive vehicles and the like. This invention relates also to a novel method of producing such panels.

It is customary to illuminate automotive dashboard and aircraft panels primarily to backlight any nomenclature on the faces thereof, and to outline their various instruments and gages. U.S. Pat. Nos. 3,545,100 and 3,621,595, for example, disclose a method of manufacturing instrument panels which utilize an EL (electroluminescent) light source for illuminating selected areas on the face of the panel.

As taught by these two patents, a sheet of light transmissive plastic material is vacuum formed over a die plate, which forms in the sheet a plurality of recesses for accommodating a variety of instruments. A plurality of EL lamps are then mounted in the back of the formed sheet with their illuminable surfaces surrounding the instrument recesses and facing the inside of the formed sheet. The back of the sheet, which is surrounded by a flange, is then filled with a potting compound, which covers the EL lamps and secures them against movement relative to the formed sheet. Thereafter openings are formed in the bottoms of the recesses and instruments are secured in the recesses with their faces fronting on the openings to be surrounded by the EL lamps that are embedded in the potted sheet. This completes the instrument panel, which can then be secured in place in an aircraft or automotive vehicle, after which the leads or the EL lamps are connected to a power supply selectively to be illuminated thereby.

Among the major advantages of EL panels of the type described is that they can be readily shaped into plane or curved surfaces; and they also can utilize a relatively low power source for energizing the various EL lamps in the panel. Among the disadvantages of these prior art panels, however, is that the potting material, which is flowed into the back of the panel to secure the EL lamps in place, adds considerably to the overall weight and cost of the panel. It is therefore most desirable to be able to reduce the quantity of potting material employed, but without altering the quality of the finished instrument panel. Moreover, because of the differences in the rates of contraction and expansion of the plastic sheet and the potting material, respectively, the possibility of distortion of the finished panel in response to extreme temperature changes, such as during curing of the potting material, is reduced as the quantity of potting material is reduced.

Heretofore efforts have been made to reduce the overall weight of panels of the type described by using a milling machine for hogging out portions of the potting material at the rear of the panel. The disadvantage of this procedure, of course, is that it adds considerably to the overall cost of the panel, and does not solve the problem of panel distortion which may occur during curing.

It is an object of this invention, therefore, to provide an improved EL panel of the type described which utilizes substantially less potting material than prior such panels, and therefore is substantially lighter in weight and less expensive to manufacture.

Another object of this invention is to provide an improved method for minimizing the amount of potting material required to be used during the fabrication of the EL panels.

Other objects of the invention will be apparent hereinafter from the specification and from the recital of the appended claims, particularly when read in conjunction with the accompanying drawings:

SUMMARY OF THE INVENTION

A first sheet of thermoplastic material is vacuum formed over a first die plate, which is designed to form in the center of the sheet a plurality of recesses for accommodating a variety of instruments, and to form around the outside of the sheet adjacent its periphery a shallow trough or recess for accommodating excess potting compound A second sheet of thermoplastic material is vacuum drawn over a second die plate which is shaped to form the second sheet into a configuration which is generally complementary to, but slightly smaller than the first sheet.

One or more flat, planar EL lamp elements are then mounted in the back of the first formed sheet to surround the recesses that are to accommodate instruments. Potting compound is then poured or otherwise flowed into the back of the first sheet to cover the EL lamp elements and to fill the back of the portion of the sheet lying inside of the trough.

The second formed sheet is then forced into the back of the first sheet while the potting compound is in a fluid state, thus forcing excess potting compound to be forced outwardly into the trough surrounding the first panel, thus leaving in the back of the first panel only the minimum amount of potting material necessary to seal the EL lamp elements in the back of the first shell or panel.

After the potting material has been cured, the excess material represented by the trough section may be cut away and the closed ends of the recesses in the first or front shell can be cut away to accommodate the desired instruments. The EL lamp element leads are also exposed for connection to a power source by removing selected portions of the potting material.

THE DRAWINGS

DETAILED DESCRIPTION OF THE INVENTION

Figure 8:
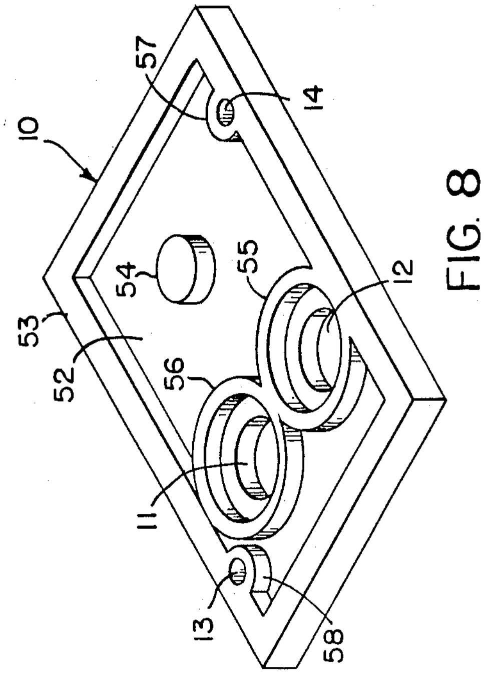
FIG. 8 is a perspective view showing the back or rear face of a finished panel as it appears after the shells of FIG. 5 have been potted or molded together and trimmed.

Referring first to FIG. 8, 10 denotes generally one type of illuminated EL panel made according to the teachings of this invention. It is rectangular in configuration, and has therethrough a pair of spaced, circular instrument openings 11 and 12, and a pair of mounting holes 13 and 14, which can be used for securing the panel to the frame of an automotive or aircraft vehicle, or the like. As noted hereinafter, this panel is produced by potting or molding together two, vacuum formed, plastic shells, and then removing or trimming away selected portions of the shells and potting compound.

Figure 1:
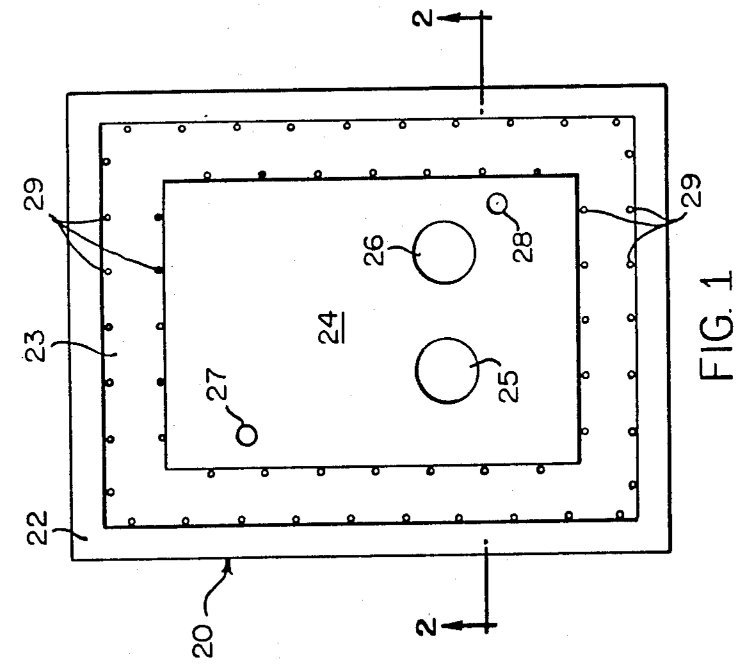
FIG. 1 is a plan view of a first die plate, which is used in preparing the front shell of a molded instrument panel made according to one embodiment of this invention.
Figure 2:
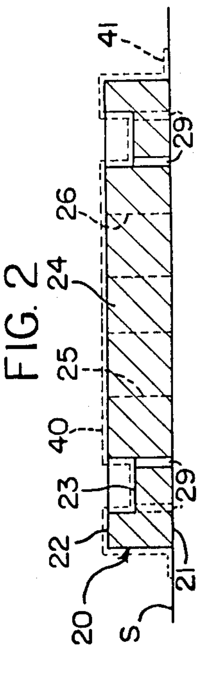
FIG. 2 is a sectional view taken along the line 2—2 in FIG. 1 looking in the direction of the arrows, and showing in phantom by broken lines the outline of a plastic shell as it appears after it has been vacuum formed over this die plate.

Referring to FIGS. 1 and 2, 20 denotes one of two rectangularly shaped die plates, which are used for vacuum forming the two above-noted plastic shells that are used for producing the panel 10. Plate 20, which is configured to form the front shell for panel 10, has a plane, flat underside 21, which is adapted to be disposed in known manner on the perforated operating surface S (FIG. 2) of a conventional vacuum drawing plenum. The plate also has a plane upper surface 22 containing a rectangularly shaped, centrally located trough or recess 23, which surrounds a rectangular center section 24 of the plate, and which has a uniform depth equal to approximately one half the thickness of the plate. The center section 24 has therethrough a first pair of spaced, circular openings 25 and 26, which are similar in size and which are located adjacent one end of the plate (the lower end as shown in FIG. 1), and a second pair of smaller openings 27 and 28, which are located adjacent diagonally opposed corners, respectively, of the center section 24. Also, a plurality of bleed holes 29 extend between the bottom surface 22 of the plate and the bottom of its recess 23 around its opposed side edges, so that adjacent each side thereof the bottom of the recess 23 will be in communication through the holes 29 with the vacuum generated at the surface S, when the die plate is in use.

Figure 3:
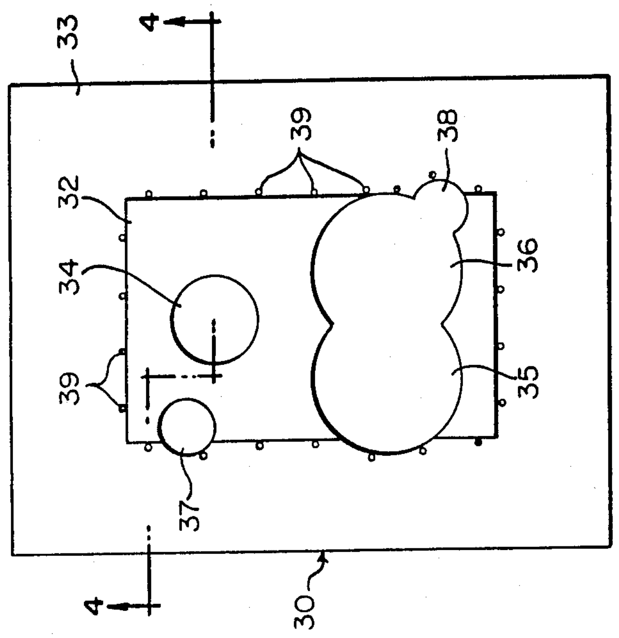
FIG. 3 is a plan view of a second die plate, which is employed for making the back shell of the panel referred to in FIG. 1.
Figure 4:
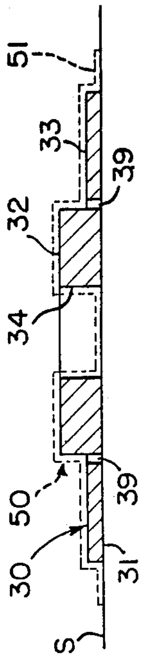
FIG. 4 is a sectional view taken generally along the line 4—4 in FIG. 3 looking in the direction of the arrows, and showing in phantom by broken lines the outline of a plastic shell as it appears after being vacuum formed over this second die plate.

Referring now to FIGS. 3 and 4, 30 denotes the other die plate, which also has a plane underside 31 that is adapted to be placed on the operating surface S of the vacuum drawing mechanism, and a plane, parallel, raised upper surface or boss 32, which is surrounded by a rectangularly shaped flange 33 of reduced thickness. Extending through plate 30 adjacent one end of its raised center section 32 is a circular opening 34 (FIG. 3) the center of which is located on the centerline of plate 30. Extending through plate 30 adjacent the opposite end of its center section 32 are two, additional, circular openings 35 and 36, which overlap one another adjacent the centerline of the plate 30. Adjacent diagonally opposite corners of its central section 32 the plate also has therethrough another pair of circular openings 37 and 38 (FIG. 3) the latter of which overlaps the opening 36. Also, as in the case of plate 20, the plate 30 has therethrough a plurality of spaced bleed holes 39, which open at one end on the bottom surface 31 of the plate, and at their opposite ends on flange 33 adjacent the outer marginal edges of the center section 32.

In use, plate 20 is placed on surface S (FIG. 2), and a rectangular sheet of thermoplastic material such as for example a cellulose acetate or polyvinyl resin or the like is placed over its upper surface. The layer of plastic is then heated and drawn downwardly over the upper surface of plate 20 by the vacuum which is generated as surface S, thus causing the sheet to be formed into a front shell of the type denoted at 40 in FIGS. 2 and 5 to 7. This sheet of plastic is slightly larger than the die plate 20, so that when the shell 40 is formed, its marginal edges will be drawn downwardly against the surface S around the outside of plate 20 to form around the shell a lateral flange portion 41.

In a similar manner, the die plate 30 is seated on the operating surface S of the equipment, and a rectangularly shaped sheet of thermoplastic material is then heated and drawn over the plate 30, thereby forming this sheet of plastic into the configuration of the back shell, which is denoted at 50 in FIGS. 4 to 7. As in the case of shell 40, the plastic sheet which is drawn downwardly over plate 30 is slightly larger in size than the plate, so that the shell 50 also has formed around its outer peripheral surface a lateral flange portion 51.

Figure 5:
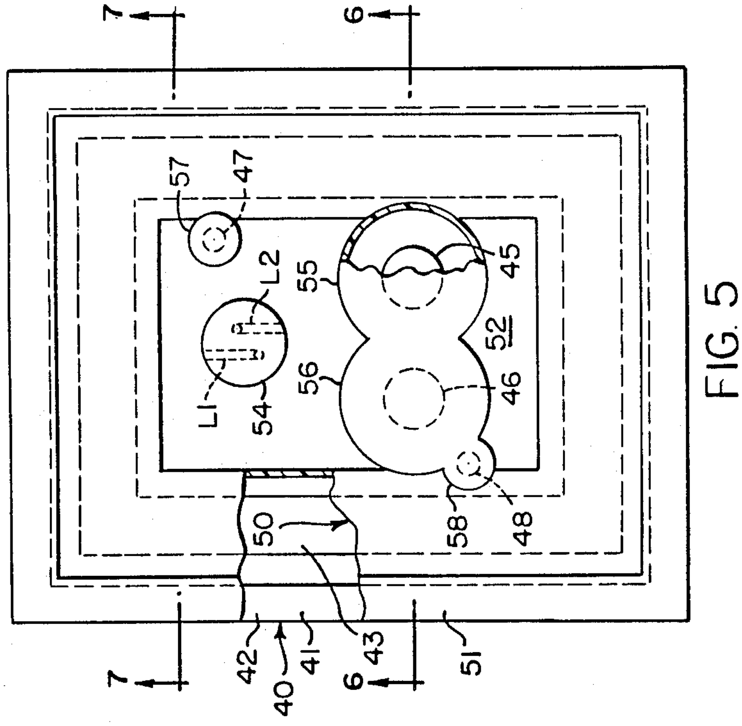
FIG. 5 is a plan view of the two shells made by the die plates of FIGS. 1 to 4 as they appear when properly assembled one relative to the other during production of a panel of the type referred to in FIG. 1, and with portions of one of the shells being cut away and shown in section for purposes of illustration.
Figure 6:
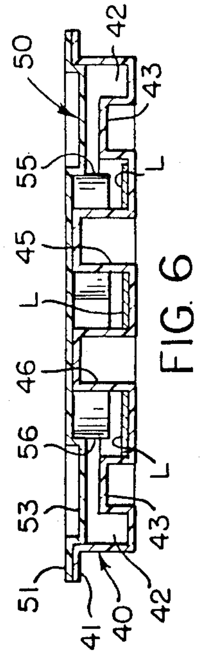
FIG. 6 is a sectional view taken generally along the line 6—6 in FIG. 5, looking in the direction of the arrows.

After the respective shells 40 and 50 have been fabricated, the front shell 40 is inverted so that the portions thereof which had been drawn downwardly by the circular openings 25, 26, 27 and 28 in plate 21, now form two pairs of spaced, upstanding cylindrical bosses 45, 46, 47 and 48, respectively (FIGS. 5 and 6). The portion of the shell 40 drawn downwardly into the recess 23 in plate 20 now forms adjacent the outer marginal edge of shell 40 an upstanding, rectangularly shaped boss or ridge 43, which surrounds the center section 44 of the shell, and which in turn is surrounded by a trough or overflow recess 42 which was formed by that portion of the die plate 20 that surrounded the outside of the die recess 23.

At this stage one or more conventional EL (electroluminescent) lamp elements L (FIGS. 6 and 7) are mounted on the inside surface of shell 40 (the upper surface in FIGS. 6 and 7) so that the edges of registering openings in the lamp or lamps surround the upstanding circular bosses 45 and 46 of the shell, and so that the illuminable lamp surfaces face the front of shell 40 to backlight, when energized, any nomenclature printed or otherwise formed on the face of the shell. In the embodiment illustrated a single lamp element L is employed, and as shown more clearly in FIGS. 6 and 7, lies within the upstanding rectangular ridge 43 of shell 40 so that ridge 43 projects above and surrounds element L. After the EL element has been properly inserted into the shell 40, the portion of the shell lying inwardly of the rectangular ridge 43 is filled with a conventional, electrically insulating potting compound, which initially is in fluid form and therefore covers the EL element and also surrounds the lower ends of the upstanding bosses 45 to 48. While the potting compound is still in liquid or fluid form, the back shell 50 is inverted, and is inserted and forced downwardly (FIGS. 6 and 7) into the top of the inverted shell 40 until its flange 51 engages flange 41 on the lower shell, and in such manner that the downwardly projecting surfaces thereon, such as for example sections 52 and 53 which were formed by the sections 32 and 33 of the die plate 30, will be forced against the still-liquid potting compound, so that a substantial portion of the latter is forced radially outwardly over the top of the ridge 43 on the lower shell 40, and into the trough 42 in the bottom shell.

Figure 7:
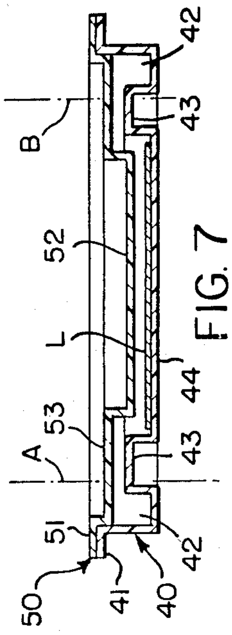
FIG. 7 is a sectional view taken generally along the line 7—7 in FIG. 5 looking in the direction of the arrows.

As shown for example in FIG. 7 as the section 52 on the upper shell 50 is forced downwardly, it finally engages, or approximately engages, the upper surface of the EL lamp element L, while the upstanding bosses 55, 56, 57 and 58, which were formed in the shell 50 by the corresponding openings 35 to 38, respectively, in plate 30, engage and register coaxially with the upper ends of the circular bosses 45 to 48, respectively, of the underlying shell 40. It will be noted, however, that the bosses 55 and 56 on the upper shell 50 are larger in diameter than the bosses 45 and 46 which they surround; and moreover, they project only part way downwardly into the shell 40 (FIG. 6) so that their inner ends do not engage the element L. This leaves a large annular space between the shells around the outsides of the circular bosses 45 and 46, and also a space beneath the inner ends of the bosses 55 and 56 so that, when the upper shell 50 is forced downwardly onto the lower shell, any excess potting compound is free to flow outwardly beneath the lower ends of the bosses 55 and 56 and laterally outwardly over the ridge 43 into the trough 42. The remaining potting compound, however, which is not forced outwardly, remains between the two shells to secure the shells together when the potting compound has been cured.

Also as shown in FIG. 5, the opening 34 in plate 30 forms on the upper shell 50 an upstanding circular boss 54 which can be filled with the potting compound when the upper shell is forced downwardly into the lower shell 40. The resulting circular lug of potting material, which will exist after the assembly has been cured, is disposed to contain the leads L1 and L2 for the EL element L, as shown for example by broken lines in FIG. 5. Although not illustrated, a tubular insert, if desired, can also be employed in combination with the boss 54 to provide ready access to the wire leads L1 and L2 after the assembly has been cured.

After the assembly has been cured the back of panel 10 is machined to mill or otherwise cut away the upper ends of the bosses 45–48 and 55–58 thereby to expose the instrument openings 11 and 12 (FIG. 8) and the mounting screw openings 13 and 14 in the finished panel 10. During this operation the excess potting compound that was squeezed out into the trough 42 is removed by milling away the ridge 43. Alternatively the excess portion of the assembly lying outwardly from the planes denoted at A and B, respectively, in FIG. 7, and at the opposite ends of the assembly, may be trimmed away in any desired manner so that the final assembly, after trimming, will have the rectangular configuration similar to that illustrated by the panel 10 in FIG. 8. The instrument openings 11 and 12 can then be counterbored (FIG. 8), if desired, after which gauges or the like are mounted therein. The boss 54 is then removed to the extent necessary to expose the leads L1 and L2; and the panel 10 can then be mounted as desired with its EL element connected to a power supply for energizing the lamp L, and consequently the face of the panel, when desired.

From the foregoing it will be apparent that the present invention provides a unique approach for considerably reducing the overall weight and cost of EL panels of the type described, as compared with prior such panels. As a matter of fact, it is possible to reduce the weight of a known panel by approximately 50% without changing its mechanical dimensions, and without materially reducing its overall strength. For example, in the case of panel 10, wherein the EL lamp element can be as thin as 0.03 inch, it is possible to retain an overall panel thickness of as little as 0.220 inch, and yet reduce its thickness in the vicinity of the EL element to as little as 0.080 inch. Moreover, as shown in FIG. 8, a large, central recess is formed in the back of panel 10 by the center section 52 of shell 50, thus providing a clearance for accommodating nuts that are used for mounting circuit breakers and other elements on the back of the panel.

During assembly of the lamp element into the lower shell 40 it is possible to hold the lamp against movement with plastic standoffs, which are held down on the lamp by external weights. When the potting compound is poured into the lower shell it retains the EL lamp against movement, so that the external weights can then be removed; but the plastic standoffs can remain within the assembly without causing any harm.

A particularly important feature of this invention is that it obviates the need for machining a cavity or recess into the back of an EL panel after it has been potted, which was the common practice prior to this invention. This feature eliminates the possibility of damaging the embedded EL element with a cutting tool during formation of the cavity. Also, by using the back shell (the upper shell in FIGS. 5 to 7) to force liquid potting compound from the front shell into the trough 42, it is possible to design the back shell to leave portions of the potting compound wherever desired, and to remove excess potting compound where it is not absolutely required. Obviously with this method it is also possible to embed studs or mounting bolts in the back of the assembly so that the mounting screws will not be visible from the front of the panel.

Although in FIGS. 6 and 7 the shell sections 43 and 53 have been shown to be slightly spaced from one another to allow excess potting material to flow over section 43 into the trough 42, it will be apparent that sections 43 and 53 may be engaged or nearly engaged with each other by the time that the back shell 50 has become fully seated in shell 40, because by that time the excess potting material will have passed over section 43 into trough 42.

While it has been suggested that the rear shell be formed of a thermoplastic material, it will be apparent that other types of preformed back shells can be used for squeezing excess potting compound from the front shell without departing from this invention. Moreover, while this invention has been illustrated and described in detail in connection with only certain embodiments thereof, it will be apparent that it is capable of still further modification, and that this application is intended to cover any such modification as may fall within the scope of one skilled in the art or the appended claims.

What we claim is:

1. A method of producing an electroluminescent panel for instruments and the like, comprising preparing a first, light transmissive shell having in the back thereof a pair of spaced recesses, one of which surrounds a projection on said first shell, preparing a second shell having therein a first recess for accommodating the projection on said first shell, and having around said first recess a projection complementary to said one recess in said first shell, placing an electroluminescent lamp element in said one recess in said first shell and filling the remainder of the last-named recess with a fluid potting material to cover said element, and molding the two shells together by pressing said second shell into the back of said first shell to have the projection on said second shell overlie said element and force excess potting material out of said one recess into the other recess in said first shell.

2. A method as defined in claim 1, including removing excess potting material from the molded shells after said potting material has set.

3. A method as defined in claim 2, including removing a portion of the projection on said first shell and a registering portion of said second shell to form an instrument opening through said molded shells.

4. A method as defined in claim 1, including providing a pair of die plates, one of which has therein an opening for forming said projection on said first shell, and the other of which has therein an opening for forming said first recess in said second shell, and vacuum forming said first and second shells over said one and said other die plate, respectively.

5. A method of producing an EL instrument panel, comprising preparing a light transmissive shell having in the back thereof a recess, inserting in said recess an EL lamp element having therethrough an opening, filling said recess with a fluid potting material to cover said element, pressing a backing member into said recess to force excess potting material out of said recess while the potting material is still fluid, allowing the potting material to set and form a molded assembly in which the EL element is fixed between said shell and said backing member, and forming through said assembly an opening which registers with the opening in said EL element, and which is disposed to have an instrument mounted therein.

* * * * *